(12) United States Patent
Gilbert et al.

(10) Patent No.: US 11,731,728 B2
(45) Date of Patent: *Aug. 22, 2023

(54) COMPRESSION PISTON

(71) Applicant: Fox Factory, Inc., Braselton, GA (US)

(72) Inventors: Damon Gilbert, Aptos, CA (US);
Christopher Paul Cox, Capitola, CA (US)

(73) Assignee: Fox Factory, Inc., Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/373,578

(22) Filed: Jul. 12, 2021

(65) Prior Publication Data

US 2021/0339821 A1 Nov. 4, 2021

Related U.S. Application Data

(63) Continuation of application No. 16/522,433, filed on Jul. 25, 2019, now Pat. No. 11,066,123, which is a
(Continued)

(51) Int. Cl.
*B62K 25/08* (2006.01)
*F16F 9/348* (2006.01)
(Continued)

(52) U.S. Cl.
CPC ............. *B62K 25/08* (2013.01); *B62K 25/10* (2013.01); *F16F 9/061* (2013.01); *F16F 9/19* (2013.01);
(Continued)

(58) Field of Classification Search
CPC ......... B62K 25/08; B62K 25/10; F16F 9/061; F16F 9/19; F16F 9/34; F16F 9/3485;
(Continued)

(56) References Cited

U.S. PATENT DOCUMENTS

| 3,256,960 A | * | 6/1966 | Casimir | ................. | F16F 9/464 |
| | | | | | 188/266.2 |
| 5,078,241 A | * | 1/1992 | Ackermann | ........... | F16F 9/446 |
| | | | | | 188/266.7 |

(Continued)

FOREIGN PATENT DOCUMENTS

| EP | 1188950 A2 | 3/2002 |
| EP | 3109502 A2 | 12/2016 |

OTHER PUBLICATIONS

European Examination Report for European Application No. 16176260. 4, 7 pages, dated May 14, 2018.
(Continued)

*Primary Examiner* — Vishal R Sahni

(57) ABSTRACT

A compression damper of a shock absorber includes: a single adjustable fluid circuit configured for controlling a damping rate associated with multiple compression speeds of the shock absorber, wherein the single adjustable fluid circuit includes a fluid passageway through a base valve; and a positionally adjustable floating shim stack positioned at one end of the fluid passageway, the positionally adjustable floating shim stack configured for selectively blocking a flow of fluid through the fluid passageway.

10 Claims, 12 Drawing Sheets

Related U.S. Application Data continuation of application No. 15/192,842, filed on Jun. 24, 2016, now Pat. No. 10,363,987.

(60) Provisional application No. 62/185,132, filed on Jun. 26, 2015.

(51) Int. Cl.

| | |
|---|---|
| *F16F 9/44* | (2006.01) |
| *B62K 25/10* | (2006.01) |
| *F16F 9/06* | (2006.01) |
| *F16F 9/19* | (2006.01) |
| *F16F 9/34* | (2006.01) |
| *F16F 9/36* | (2006.01) |
| *F16F 9/56* | (2006.01) |

(52) U.S. Cl.
CPC .............. *F16F 9/34* (2013.01); *F16F 9/3485* (2013.01); *F16F 9/3488* (2013.01); *F16F 9/36* (2013.01); *F16F 9/44* (2013.01); *F16F 9/446* (2013.01); *F16F 9/56* (2013.01); *F16F 2228/066* (2013.01); *F16F 2230/00* (2013.01)

(58) Field of Classification Search
CPC .... F16F 9/3488; F16F 9/36; F16F 9/44; F16F 9/446; F16F 9/56
See application file for complete search history.

(56) References Cited

U.S. PATENT DOCUMENTS

| | | | | |
|---|---|---|---|---|
| 5,176,229 A | * | 1/1993 | Kanari | F16F 9/364 |
| | | | | 188/315 |
| 5,579,814 A | * | 12/1996 | Jones | F16F 9/432 |
| | | | | 141/98 |
| 6,158,559 A | * | 12/2000 | Asa | F16C 29/084 |
| | | | | 267/64.11 |
| 6,360,857 B1 | * | 3/2002 | Fox | F16F 9/3485 |
| | | | | 188/319.1 |
| 6,505,719 B2 | * | 1/2003 | Gonzalez | F16F 9/348 |
| | | | | 280/276 |
| 6,655,510 B2 | * | 12/2003 | Kamioka | F16F 9/464 |
| | | | | 188/266.5 |
| 7,163,223 B2 | * | 1/2007 | Wesling | F16F 9/003 |
| | | | | 251/285 |
| 7,810,826 B2 | * | 10/2010 | McAndrews | B62K 25/04 |
| | | | | 280/124.157 |
| 8,256,787 B2 | * | 9/2012 | Inoue | B62K 25/08 |
| | | | | 280/275 |
| 10,363,987 B2 | * | 7/2019 | Gilbert | F16F 9/19 |
| 11,066,123 B2 | * | 7/2021 | Gilbert | F16F 9/56 |
| 2002/0096408 A1 | * | 7/2002 | Moradmand | F16F 9/348 |
| | | | | 188/316 |
| 2006/0011433 A1 | * | 1/2006 | Carlstedt | F16F 9/3228 |
| | | | | 188/322.22 |
| 2006/0231361 A1 | * | 10/2006 | Kojima | F16F 9/363 |
| | | | | 188/322.19 |
| 2010/0044975 A1 | * | 2/2010 | Yablon | F16F 9/065 |
| | | | | 188/282.8 |
| 2014/0124313 A1 | * | 5/2014 | Ericksen | F16F 9/5126 |
| | | | | 188/266 |
| 2014/0291088 A1 | | 10/2014 | Katayama et al. | |
| 2016/0017953 A1 | * | 1/2016 | Lee | F16F 9/365 |
| | | | | 188/297 |
| 2016/0375951 A1 | * | 12/2016 | Gilbert | F16F 9/061 |
| | | | | 188/280 |

OTHER PUBLICATIONS

EP Search Report for European Application No. 16176260.4, 8 Pages.

* cited by examiner

COMPRESSION PISTON

CROSS-REFERENCE TO RELATED APPLICATIONS

This application claims priority to and is a continuation of the co-pending patent application, U.S. patent application Ser. No. 16/522,433, filed on Jul. 25, 2019, entitled "COMPRESSION PISTON", by Damon Gilbert et al., and assigned to the assignee of the present invention, the disclosure of which is hereby incorporated herein by reference in its entirety.

The application Ser. No. 16/522,433 claims priority to and is a continuation of the U.S. patent application Ser. No. 15/192,842, filed on Jun. 24, 2016, now U.S. Pat. No. 10,363,987, entitled "COMPRESSION PISTON", by Damon Gilbert et al., and assigned to the assignee of the present invention, the disclosure of which is hereby incorporated herein by reference in its entirety.

The application Ser. No. 15/192,842 claims priority to and benefit of U.S. provisional patent application 62/185,132, filed Jun. 26, 2015 entitled "COMPRESSION PISTON", by Damon Gilbert et al., assigned to the assignee of the present application, and is incorporated herein, in its entirety, by reference.

BACKGROUND

Field of the Invention

Embodiments generally relate to a damper assembly for a vehicle. More specifically, the invention relates to a hydraulic circuit for use with a vehicle suspension.

Description of the Related Art

Vehicle suspension systems typically include a spring component or components and a damping component or components. Typically, mechanical springs, like helical springs are used with some type of viscous fluid-based damping mechanism and the two are mounted functionally in parallel. In some instances, a spring may comprise pressurized gas and features of the damper or spring are user-adjustable, such as by adjusting the air pressure in a gas spring. A damper may be constructed by placing a damping piston in a fluid-filled cylinder (e.g., liquid such as oil). As the damping piston is moved in the cylinder, fluid is compressed and passes from one side of the piston to the other side. Often, the piston includes vents there-through which may be covered by shim stacks to provide for different operational characteristics in compression or extension.

Conventional damping assemblies include multiple fluid passageways (also called fluid circuits), disposed within a piston, to account for varying speeds during compression, ranging from low speed compression to high speed to lockout compression mode. The piston is disposed within a cylinder with a limited sized diameter. A damping assembly's design takes into account the weight of the shock absorber (including the oil disposed therein) balanced against the size (diameter) of the shock absorber. Generally, a lighter shock absorber means a lighter vehicle for the rider to use. Additionally, the larger the diameter of the shock absorber (and the cylinders therein), the greater is the capability of the shock absorber to provide a damping function, and hence, enable an enhanced performance.

Typically, there are at least two separate fluid circuits to accommodate both high speed compression and low speed compression of the shock absorber. Thus, when an adjustment knob is turned, a high speed compression circuit may be closed, and upon such closing, a separate circuit for low speed compression may be opened. These multiple fluid circuits are disposed within the piston (the piston being within the shock absorber's cylinder) and are limited in size due to the need for multiple fluid circuits for varying compression speeds.

As the foregoing illustrates, what is needed in the art are improved techniques for adjusting compression speeds within a shock absorber, while increasing the performance of the shock absorber and maintaining or reducing its weight.

BRIEF DESCRIPTION OF DRAWINGS

The accompanying drawings, which are incorporated in and form a part of this specification, illustrate embodiments of the present technology for a dual piston system, and, together with the description, serve to explain the principles discussed below.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is applicable to alternative embodiments, modifications and equivalents, which may be included within the spirit and scope of the invention as defined by the appended claims.

Furthermore, in the following description of embodiments, numerous specific details are set forth in order to provide a thorough understanding of the present technology. However, the present technology may be practiced without these specific details. In other instances, well known methods, procedures, and components have not been described in detail as not to unnecessarily obscure aspects of the present disclosure.

Embodiments describe a novel compression piston disposed within a shock absorber, wherein the compression piston has a single adjustable circuit there through that, via a single control knob and a floating shim stack that may be variably pre-loaded, controls damping for low speed compression to high speed compression to lockout compression of the damper within the shock absorber. Further, embodiments provide a secondary pre-loaded component to be applied against the floating shim stack. Additionally, embodiments provide an oil recirculation system within the shock absorber, in which the same oil is used throughout the fork comprising the shock absorber; upon rebound, a portion of the recirculation system ingests the oil into the fluid filled chamber and from an area exterior to the compression damper and the fluid filled chamber, and upon compression, another portion of the recirculation system exhausts the oil out of the fluid filled chamber and into the exterior of the compression damper.

The following discussion will first briefly describe various embodiments. The discussion then turns to a description of the FIGS. 1-5 and embodiments shown therein.

Figure 1A:
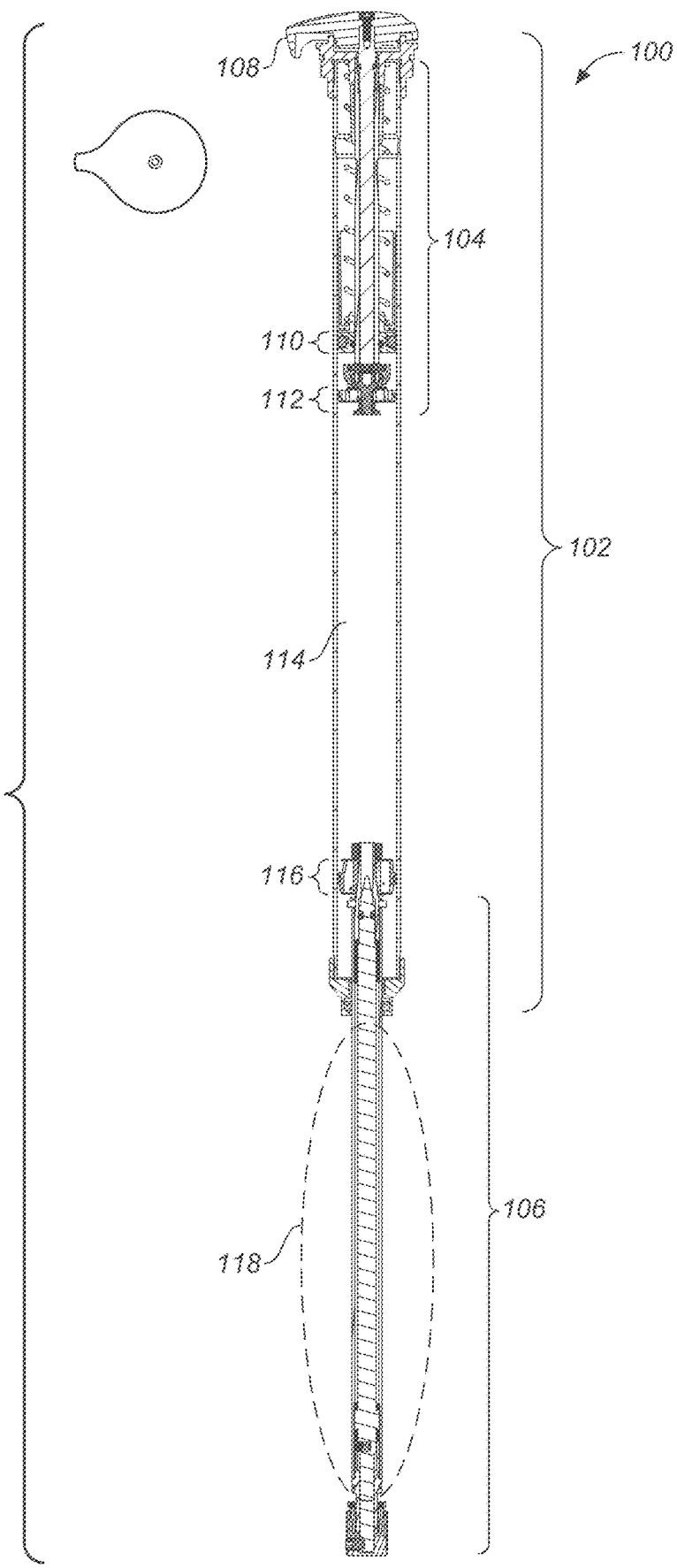
FIG. 1A depicts a cross-sectional view of a monotube damper, in accordance with an embodiment.
Figure 1B:
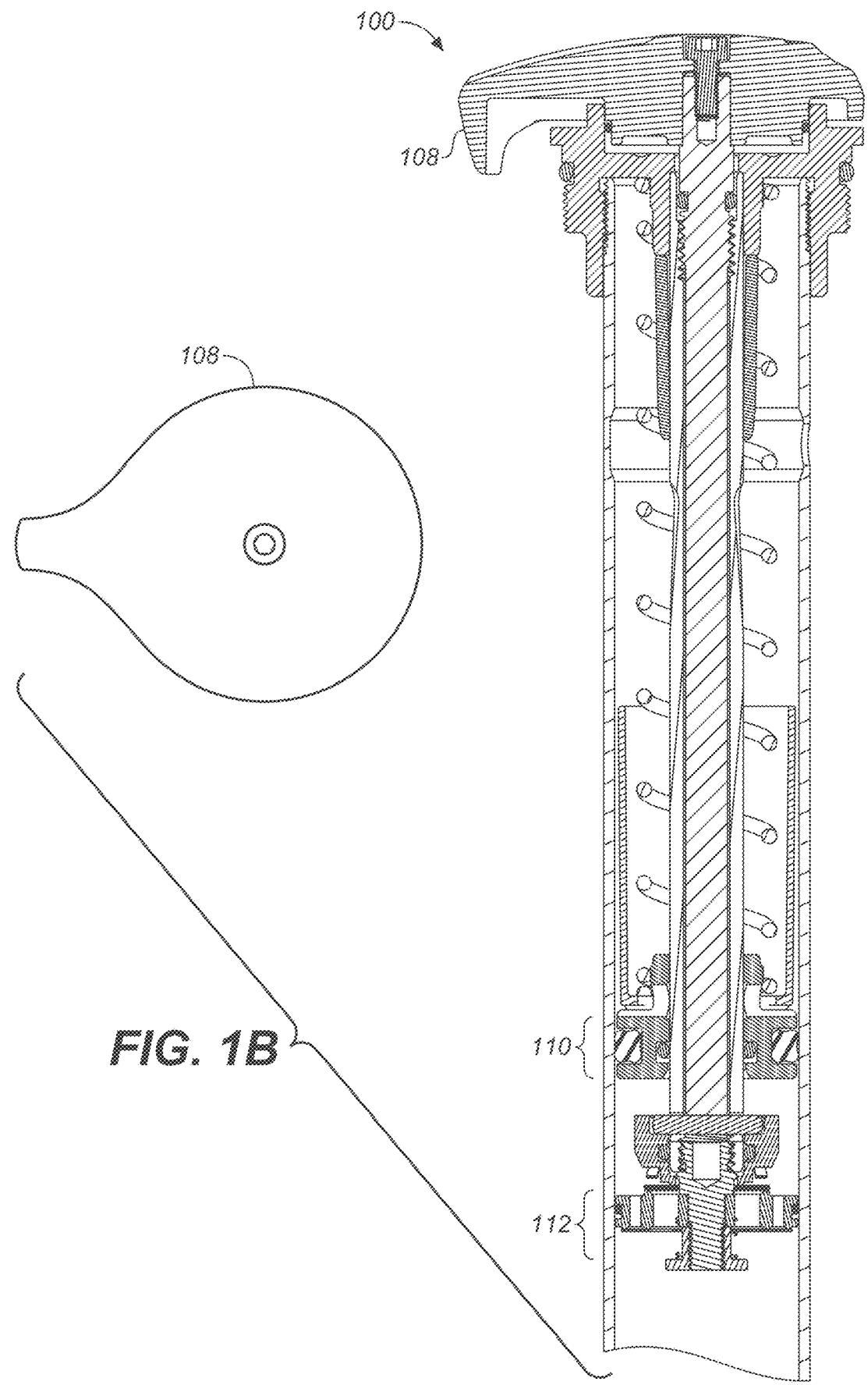
FIGS. 1B-1E depict cross-sectional views of a monotube damper, with the knob positioned in the low compression position, a high compression position, a higher compression position and a lockout position, respectively, in accordance with an embodiment.
Figure 1C:
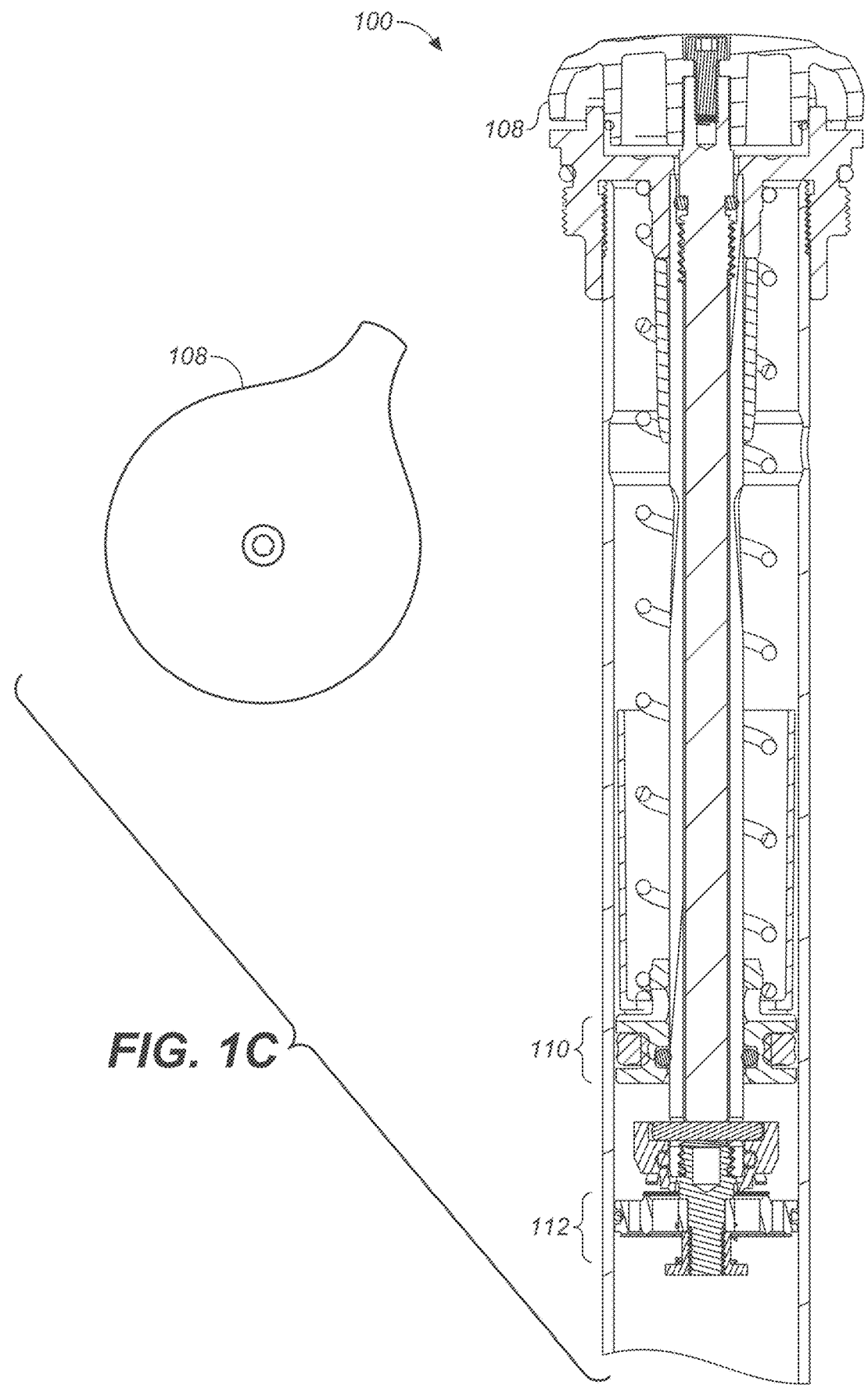
Figure 1D:
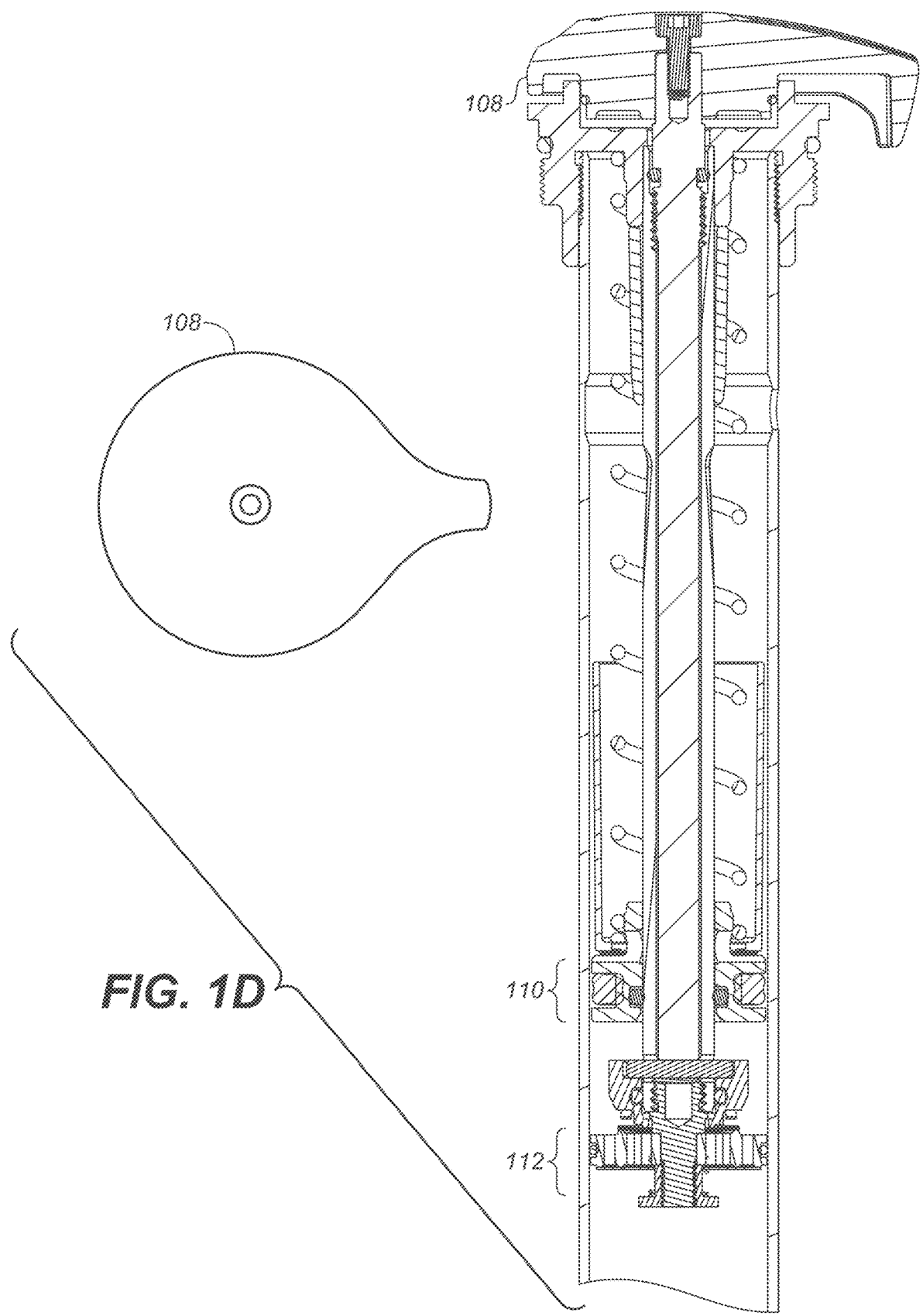
Figure 1E:
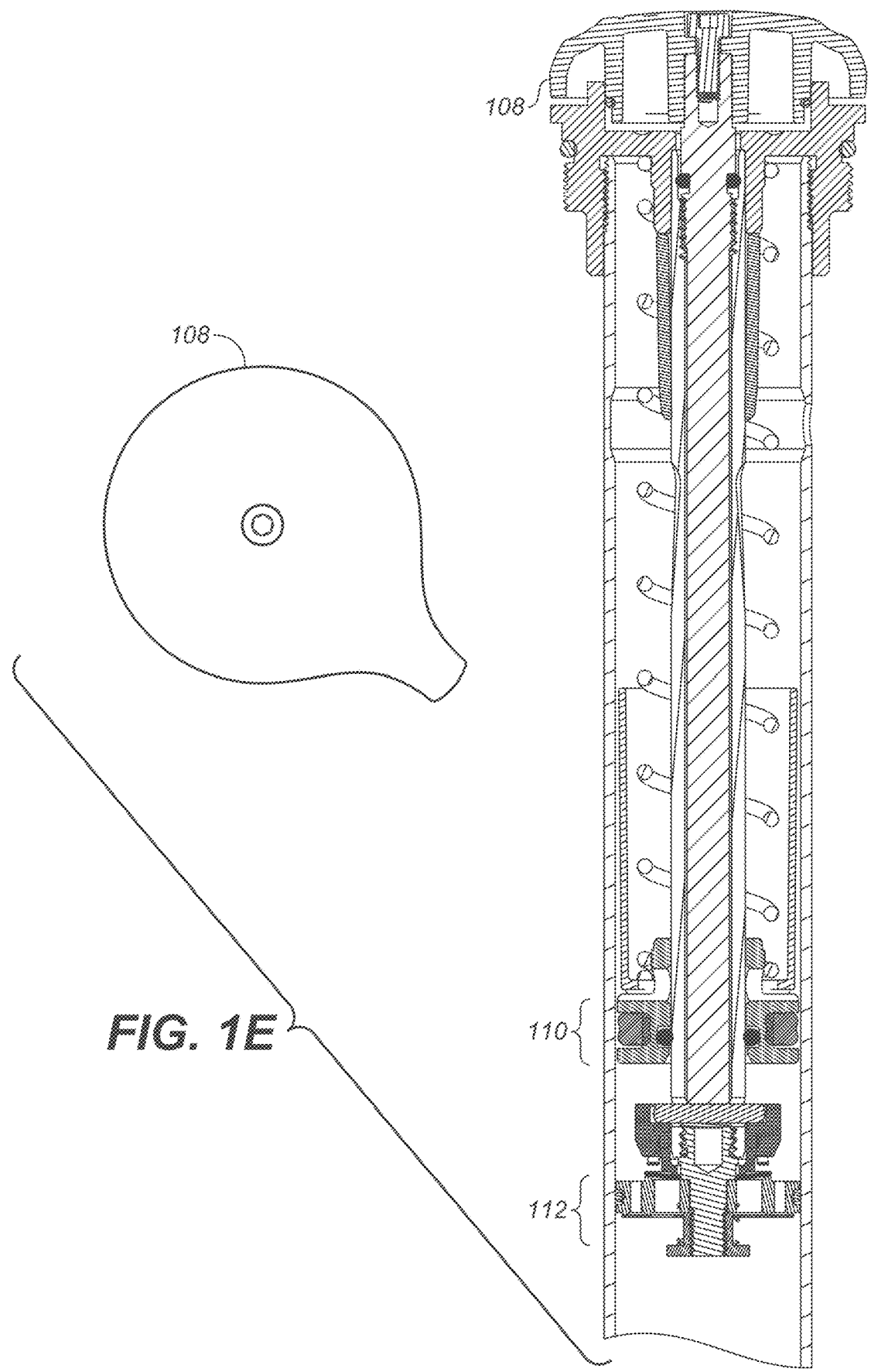

FIG. 1A depicts a cross-sectional view of a monotube damper 100, in accordance with an embodiment. The monotube damper 100 shown is configured for being disposed within a suspension fork. The monotube damper 100 shows a rod 106 telescopically disposed within the cartridge 102. The cartridge 102 is shown to include a fluid filled chamber 114, the compression damper 104 that is coupled with the knob 108 and the main piston 116 that is coupled with the rod 106. The compression damper 104 includes the internal floating piston (IFP) 110 and the compression piston 112 (also called a base valve). The portion of the rod 106 that is exposed to an oil bath within the shock absorber is indicated as element 118.

FIGS. 1B-1E depict cross-sectional views of the monotube damper 100, with the needle in the low speed compression position, a high speed compression position, a higher speed compression position, and a lockout position, respectively, in accordance with an embodiment.

Figure 2:
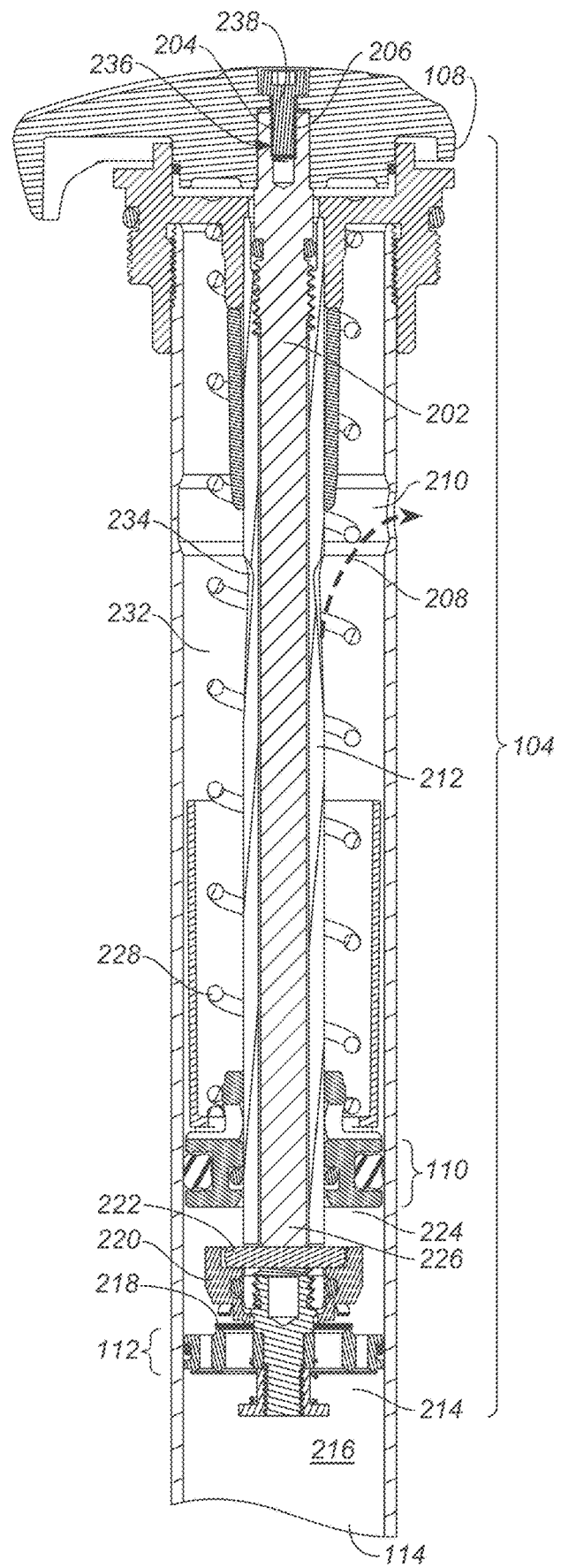
FIG. 2 depicts an enlarged cross-sectional view of the compression damper of FIG. 1A, in accordance with an embodiment.

FIG. 2 depicts an enlarged cross-sectional view of the compression damper 104 of FIG. 1A, in accordance with an embodiment. The compression damper 104 is coupled with the knob 108 having a hex shaft 238 with shaft threads 204 disposed thereon. The compression damper 104 also includes a shaft 212 surrounding a needle 202 and a coil spring 228 positioned around the shaft 212. As will be explained in more detail below, the compression damper 104 also includes at least the IFP 110, a dowel pin 222, a pre-load hat 220, a shim stack 218 (also commonly called a valve stack in the industry) of predetermined stiffness, and the compression piston 112. The compression piston 112 is disposed within and in between a first side 214 and a second side 224 of the fluid filled chamber 114, wherein the fluid is oil 216. The IFP 110 separates the air chamber 232 (filled with air) from the fluid filled chamber 114. Also shown in FIG. 2 is a leak path 208. The leak path 208 includes the curved recess 234 disposed in the shaft 212 and the passageway 210 disposed in the wall of the air chamber 232.

FIGS. 3A-3D depict, in one embodiment, enlarged cross-sectional views of a portion of the compression damper 104, and more specifically, the IFP 110, the compression piston 112, and surrounding areas, in accordance with embodiments. Further, FIGS. 3A-3D depict positions of the shim stack 218 at varying compression speeds ranging from low speed compression to high speed compression to lockout. FIGS. 3A-3D show the IFP 110 with an outside seal 302 and inside seal 304, and a dowel pin 222 lodged within the pre-load hat 220 and separating the needle 202 and shaft 212 of the compression piston 112 from the pre-load hat 220. FIGS. 3A-3D also show the wave spring 312, the gap 310 between the inner edge 332 of the shim stack 218 and a component of the base valve positioned closest to the inner edge 332 such that the shim stack 218 effectively "floats" and is not clamped (pinched) into a particular position. This gap 310 is maintained during operation, regardless of whether the shim stack 218 is positioned in the low speed compression mode, high speed compression mode or lockout mode. The shim stack 218 has an outer edge 314 and the inner edge 332 (as previously noted). Also shown is the piston face 318 of the compression piston 112, the fluid passageway 322 disposed through the compression piston 112, a shim 328 and a spring 326. Of note, also shown is the check valve 320 that enables fluid to flow from the second side 224 (see FIG. 2) of the compression piston 112 to the first side 214 of the compression piston 112, but blocks the flow of fluid through the passageway 336 from the first side 214 to the second side 224.

In one embodiment, the knob 108 may be turned upwards of approximately 220 degrees from its original position. It should be appreciated that in other embodiments, the knob 108 may be rotated more or less than 220 degrees. It should be noted that in one embodiment, the knob 108 is continuously adjustable. Further, in one embodiment, the knob 108 has one or more detents that correspond with different compression force(s). In one embodiment, the knob 108 is affixed to a hex shaft 238 of a screw (or other type of small bolt), wherein the hex shaft 238 is configured for rotatably coupling with the needle 202 (having a first end 236 and a second end 226), such that by turning the knob 108, the needle 202 is also turned, and is caused to move up or down within the air chamber 232. In one embodiment, the hex shaft 238 has threads 204 thereon and the needle 202 has matching threads 206 thereon at the first end 236 of the needle 202, such that when the knob 108 is turned, the hex shaft 238 turns, and then the needle 202 turns and moves up and down along the threads 204 of the hex shaft 238. The movement of the needle 202 downwards will ultimately cause the second end 226 of the needle 202 to push against the dowel pin 222. The dowel pin 222 then pushes downward against the pre-load hat 220. The pre-load hat 220 then pushes downward against the shim stack 218. In general, the greater the rotation of the knob 108, the further downwards into the fluid filled chamber 114 the second end 226 of the needle 202 travels such that the dowel pin's 222 downward movement causes the pre-load hat 220 to push the first end 324 of the shim stack 218 further towards the passageway 322. In one embodiment, the first end 324 of the shim stack 218 may be pushed, and thus moved, towards the passageway 322 by as much as 0.015".

During operation, and with reference to FIGS. 1A-3D, when an event that causes compression within the monotube damper 100 occurs, the rod 106 moves into the fluid filled chamber 114, pushing the oil 216 within the fluid filled chamber 114 in the direction of the knob 108 and through the compression piston 112 from the first side 214 of the compression piston 112 to the second side 224 of the compression piston 112. The oil 216 then pushes against the IFP 110, causing the IFP 110 to travel upward (toward the direction of the knob 108). When an event that causes rebound within the monotube damper 100 occurs, the rod 106 moves out of the fluid filled chamber 114, and the oil 216 flows from the second side 224 of the compression piston 112, through the compression piston 112, to the first side 214 of the compression piston 112. Further, during rebound, the IFP 110 travels downward (toward the direction of the main piston 116).

According to embodiments, during compression, oil 216 flows from the first side 214 of the compression piston 112 to the second side 224 of the compression piston 112, at varying compression speeds, via a single circuit disposed within the compression piston 112. The quantity and speed of the oil 216 flowing through the single circuit is controlled via a manual rotation of the knob 108, such manual rotation ultimately adjusting the force with which the pre-load hat 220 pushes against the shim stack 218. The more force that the pre-load hat 220 uses to push on the shim stack 218, the more fluid pressure is required to push the shim stack 218 open in order that the oil 216 may flow from the first side 214 of the compression piston 112 to the second side 224 of the compression piston 112 through the gap 316. Thus, the more resistance (provided by the shim stack 218) to the oil 216 flow through the gap 316, the greater the compression damping that occurs in the compression damper 104 (and hence the shock absorber having the monotube damper 100 therein). Additionally, in some embodiments and in response to the oil 216 flowing through the gap 316, the fluid flow causes the shim stack 218 to flex upwards enough to touch the wave spring 312, such that the wave spring 312 provides an additional, but light pre-load to the shim stack 218.

Figure 3A:
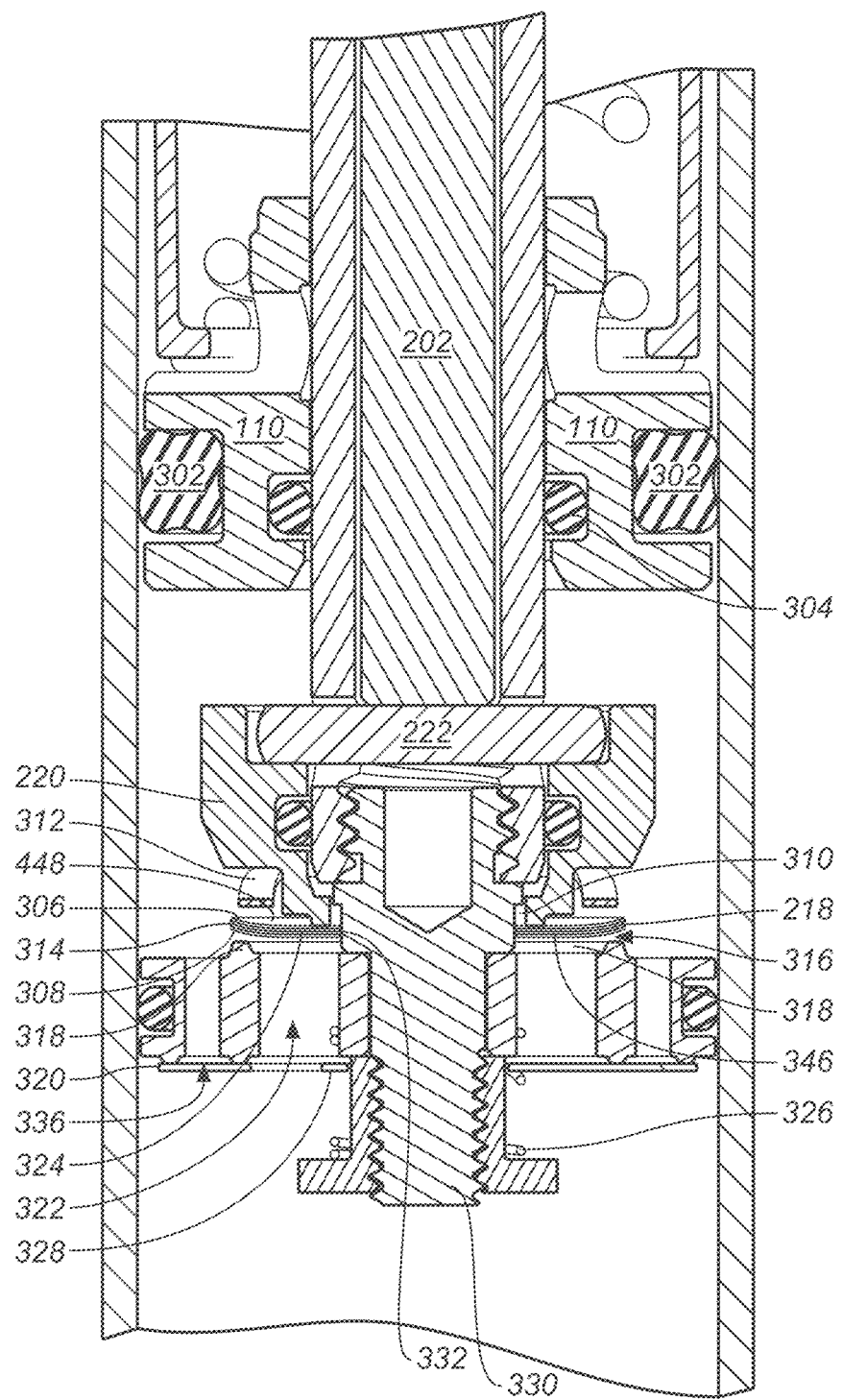
FIGS. 3A-3D depict an enlarged cross-sectional view of a portion of the compression damper of FIG. 1A, in accordance with an embodiment.

FIG. 3A depicts the shim stack 218 in a low speed compression position ("first position"). The knob 108 is set at a position such that the pre-load hat 220 is caused to be in contact with the shim stack 218, but the pre-load hat 220 is not pushing against the shim stack 218 so that the shim stack 218 moves toward and/or into the passageway 322. In this position, in response to and during a compression event, fluid (oil) pressure is applied to the shim stack 218, and the second end 306 of the shim stack 218 (that has a predetermined stiffness) flexes upwards (shown as element 308) (in the direction of the knob 108). The oil 216 will then flow through the passageway 322 and then through the gap 316, traveling from the first side 214 of the compression piston 112 to the second side 224 of the compression piston 112. If enough fluid pressure is applied (such as through a compression event causing a greater fluid flow rate), the shim stack 218 will flex upwards such that it meets and touches the wave spring 312. The wave spring 312 has a predetermined stiffness, and while it may flex upwards to a certain extent, the wave spring 312 presses against the upward flexing 308 shim stack 218 and therefore applies a light pre-load onto the shim stack 218. This light pre-load provides a resistance to any further flexing upward by the shim stack 218. The light pre-load applied to the shim stack 218 by the wave spring 312 also functions to maintain the relative positioning of the floating shim stack 218 that is being held in place by the pre-load hat 220.

Figure 3B:
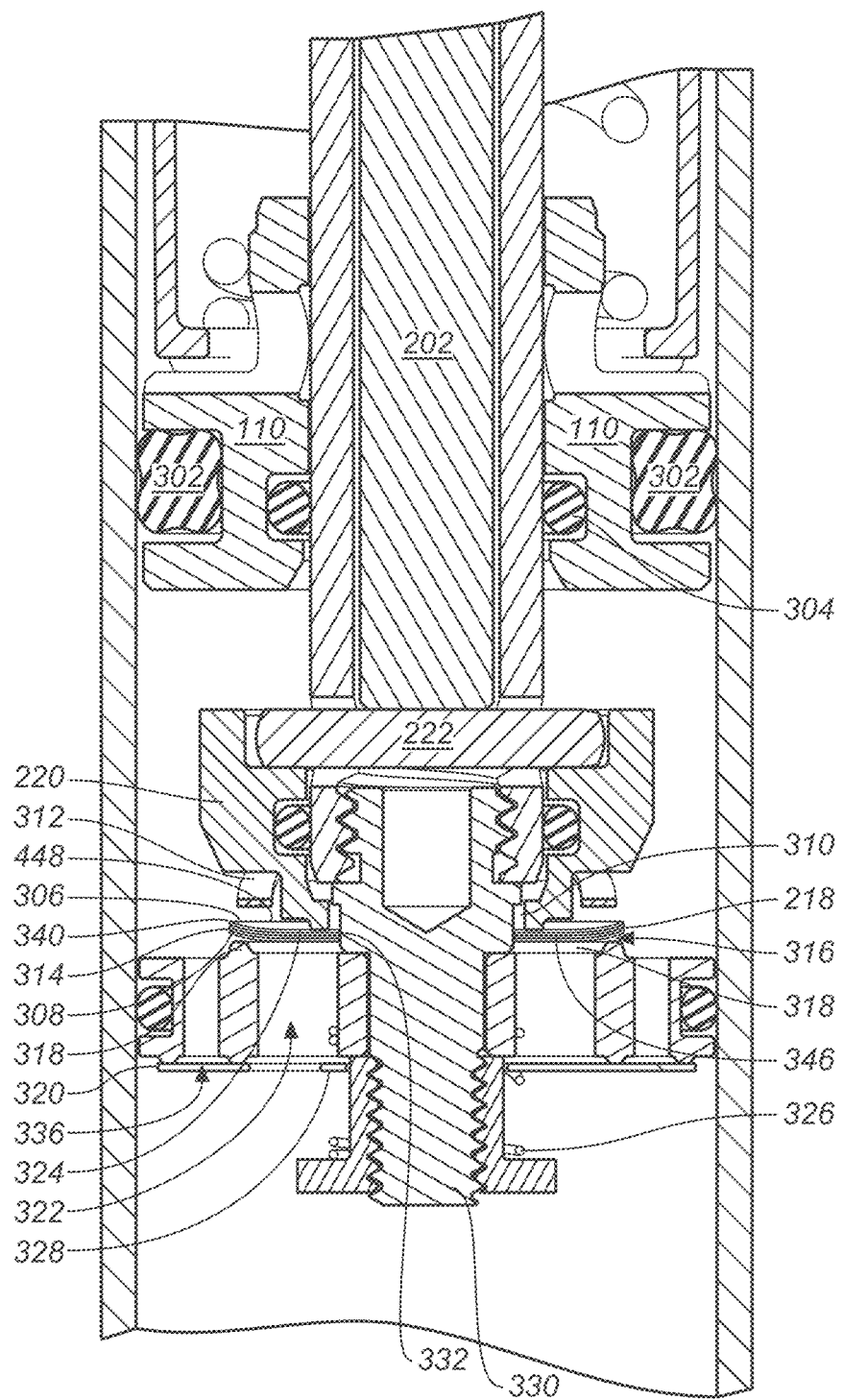

FIG. 3B depicts the shim stack 218 flexing 340 in a second position, that is set for a speed of compression that is higher than the low speed compression setting of the first position, shown in FIG. 3A, in accordance with an embodiment. The knob 108 is set at a position such that the pre-load hat 220 is caused to be in contact with the shim stack 218 and the pre-load hat 220 is pushing against the shim stack 218 so that the shim stack 218 moves a certain distance ("distance one") that is greater than zero toward and/or into the passageway 322. In this position, in response to and during the compression event, fluid pressure is applied to the shim stack 218, and the shim stack 218 (that has a predetermined stiffness) flexes upwards (shown as element 340) (in the direction of the knob 108). Of note, the shim stack 218, while flexed, appears to have a slightly concave shape ("concavity shape one"). The oil 216 will then flow through the passageway 322 and then through the gap 316, traveling from the first side 214 of the compression piston 112 to the second side 224 of the compression piston 112. If enough fluid pressure is applied (such as through a compression event causing enough of a fluid flow rate that overcomes the stiffness of the shim stack 218), the shim stack 218 will flex upwards 340 such that it meets the wave spring 312. As described herein with respect to the low speed compression positioning of the shim stack 218, the wave spring 312 functions to provide resistance to any further flexing upward by the shim stack 218 and helps hold the shim stack 218 relatively in place during such a compression event.

Figure 3C:
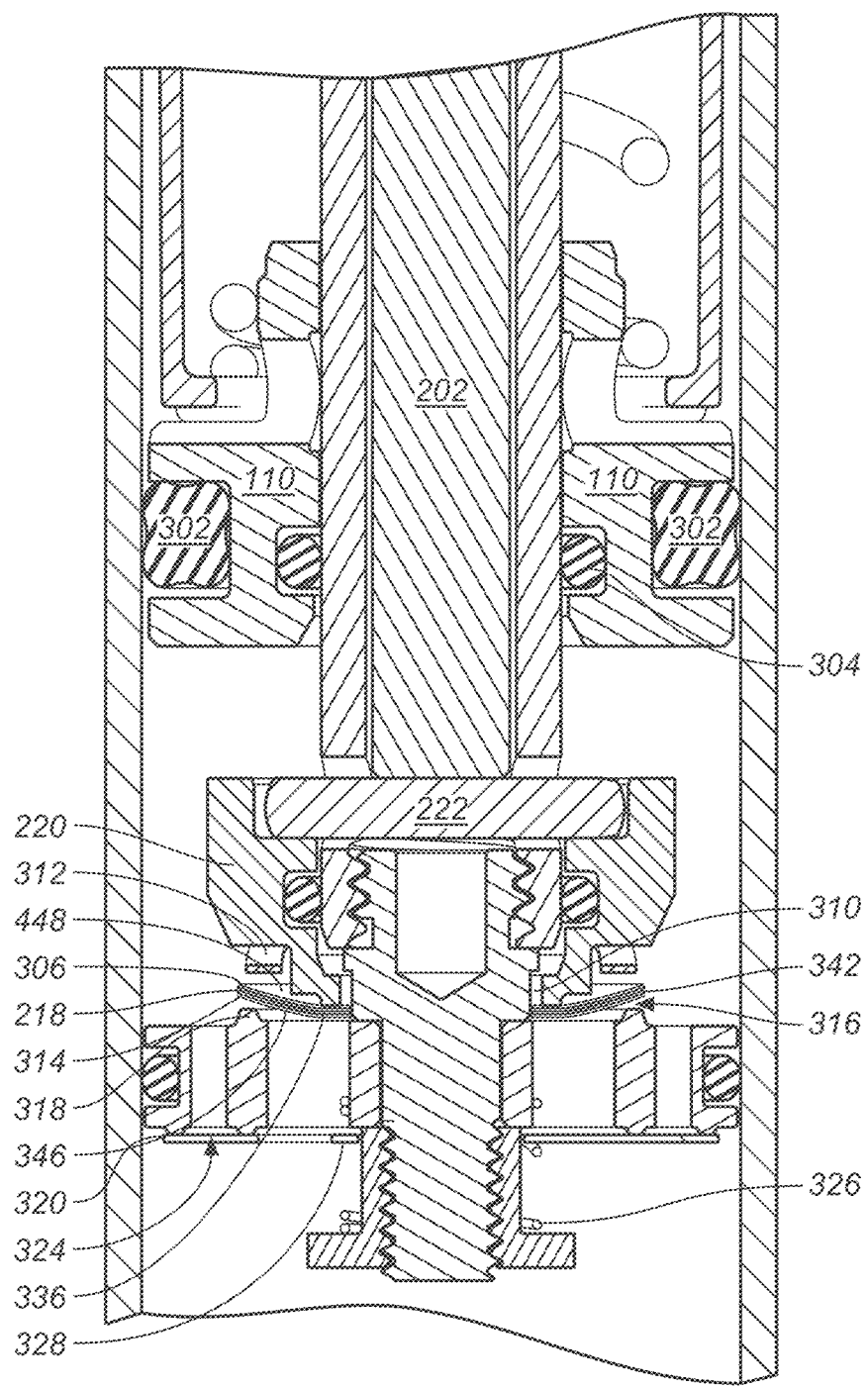

FIG. 3C depicts the shim stack 218 in a third position, that is set for a higher speed compression than the compression speed setting of the second position, shown in FIG. 3B, in accordance with an embodiment. The knob 108 is set at a position such that the pre-load hat 220 is caused to be in contact with the shim stack 218 and the pre-load hat 220 is pushing against the shim stack 218 so that the shim stack 218 moves a certain distance ("distance two") greater than "distance one" toward and/or into the passageway 322. In this position, in response to and during the compression event, fluid pressure is applied to the shim stack 218, and the shim stack 218 (that has a predetermined stiffness) flexes upwards (shown as element 342) (in the direction of the knob 108). Of note, the shim stack 218, while flexed, appears to have a concave shape ("concavity shape two") that is more concave shaped than "concavity shape one". The oil 216 will then flow through the passageway 322 and then through the gap 316, traveling from the first side 214 of the compression piston 112 to the second side 224 of the compression piston 112. If enough fluid pressure is applied (such as through a compression event causing a fluid flow rate that overcomes the stiffness of the shim stack 218), the shim stack 218 will flex upwards such that it meets the wave spring 312. As described herein with respect to the low speed compression positioning of the shim stack 218, the wave spring 312 functions to provide resistance to any further flexing upward by the shim stack 218 and helps hold the shim stack 218 relatively in place during such a compression event.

Of note, it should be appreciated that the shim stack 218 may move greater or less distances than that of "distance one" and "distance two" and may be caused to have a greater or lesser concave shape than "concavity shape one" and "concavity shape two".

Figure 3D:
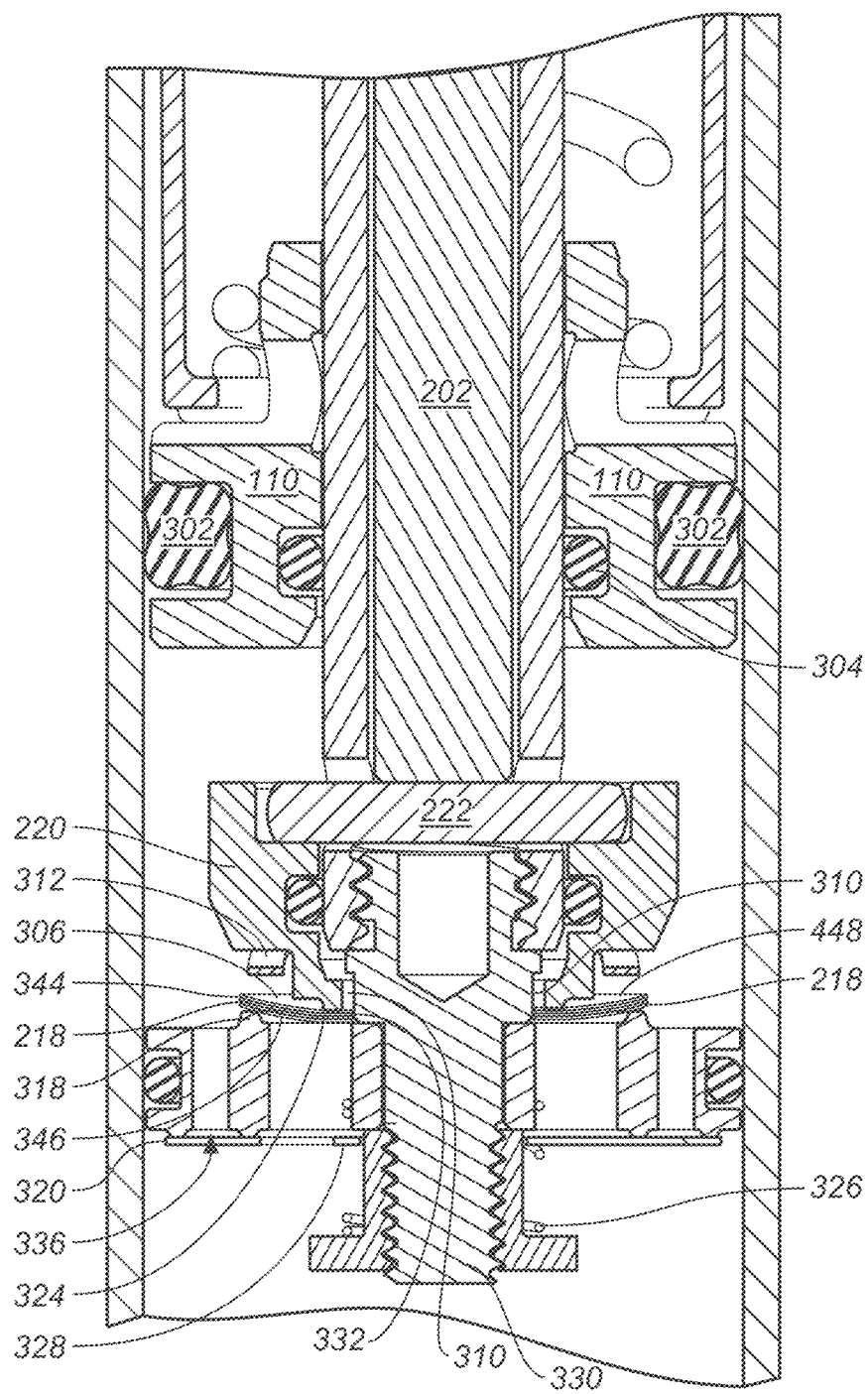

FIG. 3D depicts, in accordance with an embodiment, the shim stack 218 in a fourth position, that is set for a lockout compression position, which is for a higher speed compression setting than the compression speed setting of the third position, shown in FIG. 3C. In one embodiment, to achieve the "lockout compression position" of the shim stack 218, the knob 108 is rotated to be positioned at its greatest possible rotation. Thus, if the knob 108 is rotatable to 220 degrees, then the knob 108 is turned to the rotation position of 220 degrees to achieve the lockout compression position for the shim stack 218. In one embodiment, the knob 108 is set at a position such that the pre-load hat 220 is caused to be in contact with the shim stack 218 and the pre-load hat 220 is pushing against the shim stack 218 so that the shim stack 218 moves a certain distance ("distance three") greater than "distance two" toward and/or into the passageway 322. In one embodiment, the "distance three" is the maximum distance that the shim stack 218 is able to be moved into the passageway 322. In this position, in response to and during the compression event, fluid pressure is applied to the shim stack 218, and the shim stack 218 (that has a predetermined stiffness) does not respond to this fluid pressure with any movement such that the shim stack 218 does not flex upwards any more than it has already flexed upwards (shown as element 344) (in the direction of the knob 108) due to second end 306 of the shim stack 218 being held against the piston face 318. Of note, the shim stack 218, while flexed, appears to have a concave shape ("concavity shape three") that has a greater concave shape than "concavity shape two". The oil 216 will not be able to flow through the passageway 322 because the force of the oil in the direction of the knob 108 and against the lower surface 346 of the shim stack 218 is not enough to overcome the force of the pre-load hat 220 against the upper surface 448 of the shim stack 218 in the direction of the main piston 116 and the rod 106.

Figure 4:
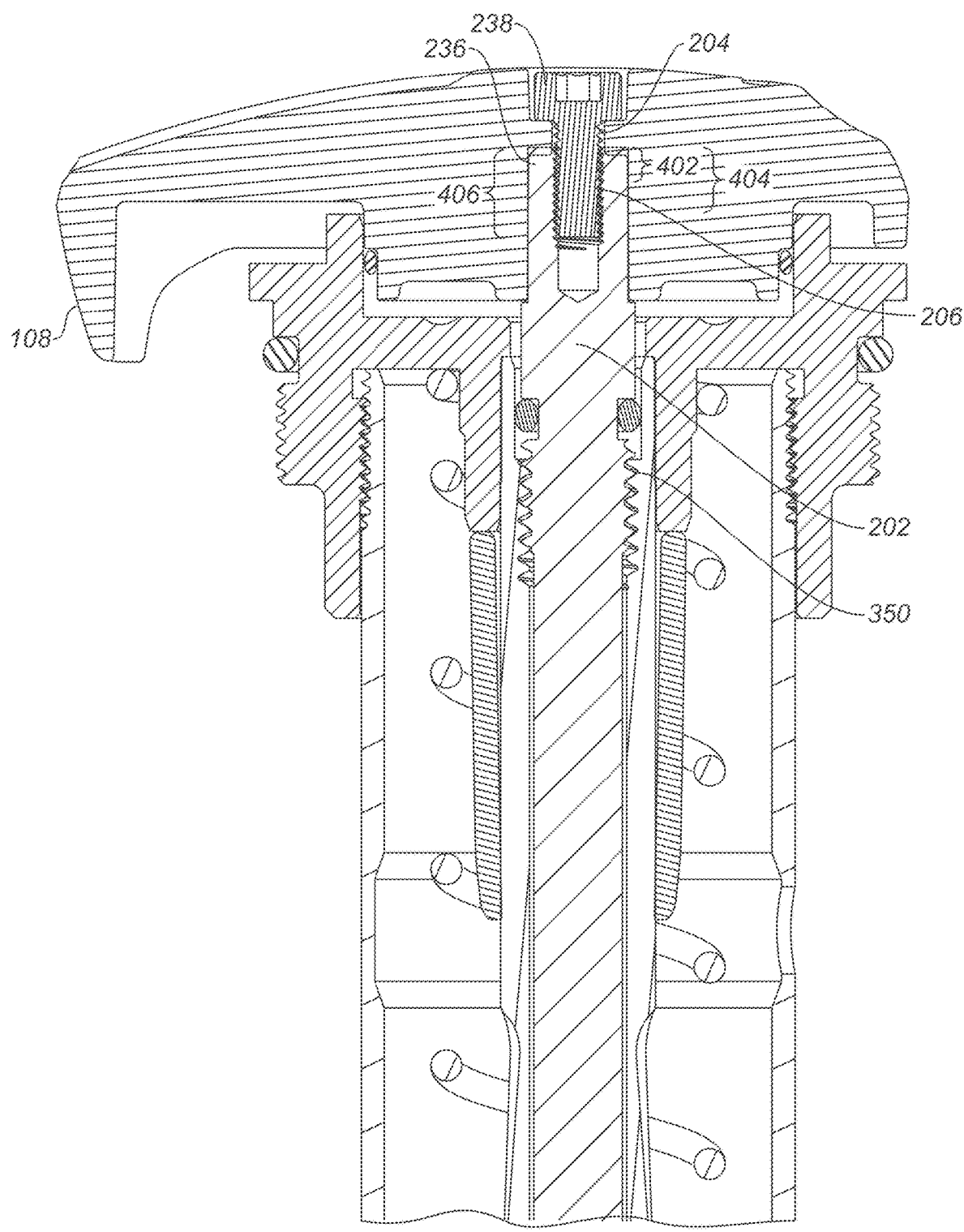
FIG. 4 depicts an enlarged cross-sectional view of a portion of the compression damper and knob shown in FIG. 1A, in accordance with an embodiment.

FIG. 4 depicts an enlarged cross-sectional view a portion of the compression damper, and more particularly, the knob 108 and the first end 236 of the needle 202, in accordance with an embodiment. Shown is the knob 108, the hex shaft 238 (of a screw, small bolt, etc.) having the shaft threads 204, and the needle 202 having the needle threads 206 at the first end 236. Also depicted are "needle distance one" 402, "needle distance two" 404 and "needle distance three" 406, according to one embodiment. In one embodiment, as shown in FIG. 4, the knob 108 and consequently the needle 202 are positioned at the low speed compression setting such that the pre-load hat 220 is not applying any pre-load onto the shim stack 218 other than that pre-load that is incidental to the pre-load hat 220 being in contact with the shim stack 218. In one embodiment, a position of the pre-load hat 220 is a default position that occurs when the knob 108 is at zero degrees rotation (i.e., the knob 108 has not been manually rotated from a possible rotation position of, for example, 0 to 220 degrees, and remains at 0 degrees, wherein the 220 degrees represents a lockout compression speed position). The "needle distance one" 402 represents the amount of travel of the needle 202 caused by the rotation of the knob 108 to a position between the minimum and the maximum knob rotation possibilities (e.g., 0 to 220 degrees, etc.).

In relation to FIGS. 3A-3D, the "needle distance one" 402 corresponds to the compression speed setting shown in FIG. 3B, when the shim stack 218 moves "distance one" toward and/or into the passageway 322, creating the shim stack "concavity shape one". The "needle distance two" 404 corresponds to the compression speed setting shown in FIG. 3C, when the shim stack 218 moves "distance two" toward and/or into the passageway 322, creating the shim stack "concavity shape two". The "needle distance three" corresponds to the compression speed setting shown in FIG. 3D, when the shim stack 218 moves "distance three" 406 toward and/or into the passageway 322, creating the shim stack "concavity shape three".

Thus, as is depicted in FIGS. 1A-4, the compression piston 112 has one circuit (fluid pathway) there through. The opening of this circuit is selectively blocked with a flexible and positionally adjustable shim stack 218. The position (and hence the selective blocking of the circuit) of the shim stack 218 is manipulated with the knob 108. As described herein, depending on the position of the shim stack 218, a desired damping rate for a particular compression speed of the shock absorber (e.g., a range between the lowest speed compression to lockout compression [including high speed compression]) is accomplished.

The benefits of embodiments of the present technology are numerous. For example, embodiments have an adjustable single fluid circuit that enables multiple damping rates for a range of compression speeds. This is in contrast to conventional technology which requires multiple circuits to enable multiple damping rates for the same range of compression speeds. Thus, to accomplish the same damping functions, conventional technology requires a manufacture of more components for a multiple fluid circuit design and thus such manufacturing process is more expensive than the manufacturing of components associated with embodiments of the present technology. Further, in one embodiment, the diameter of the fluid filled chamber 114 and the air chamber 232, and hence the compression piston 112 and the fluid passageway 322 therein are larger than the diameter of the fluid passageways of conventional technology. For example, a current piston diameter may be roughly 15.5. mm, whereas the diameter of an embodiment of the compression piston 112 is 20 mm. The larger the diameter of the fluid passageway 322, the more oil is able to pass there through at a greater rate, if need be, and thus such larger diameter increases the performance of the compression damper 104 during compression as compared to the narrower fluid passageways within conventional technology. Thus, embodiments of the present technology are designed to be of a lower manufacturing cost and to have higher performance characteristics than those of conventional technology.

Additionally and as noted herein, the wave spring 312 helps to maintain the relative positioning of the floating shim stack 218 within the compression damper 102. In so doing, the wave spring 312 also reduces potential noise problems by keeping the shim stacks 218, which are moving components, from flopping around within the compression damper 102 during operation.

Recirculation System

Conventional fork and damper technology provides for a damper placed inside of a fork leg of a fork. The damper includes a rod telescopically positioned with a cartridge. During compression and rebound, the rod moves into and out of the cartridge, respectively. One end of the rod is located in an oil bath of the fork leg (oil that serves to lubricate other moving components existing outside of the compression damper components), while the other end of the rod is located in a fluid filled damper. Conventionally, the oil within the oil bath is of a different type than that oil found within the fluid filled damper. Typically, the rod must pass through a seal before any further portion of it enters the cartridge. This seal is designed to keep any oil from the oil bath that is sticking to the shaft from entering the fluid filled chamber as the shaft passes into the fluid filled chamber. The seal scrapes off the oil from the rod's shaft as the rod's shaft enters the fluid filled chamber. Consequently, this scraping causes a certain amount of friction between the rod's shaft and the seal as the rod's shaft moves into the fluid filled chamber.

Figure 5:
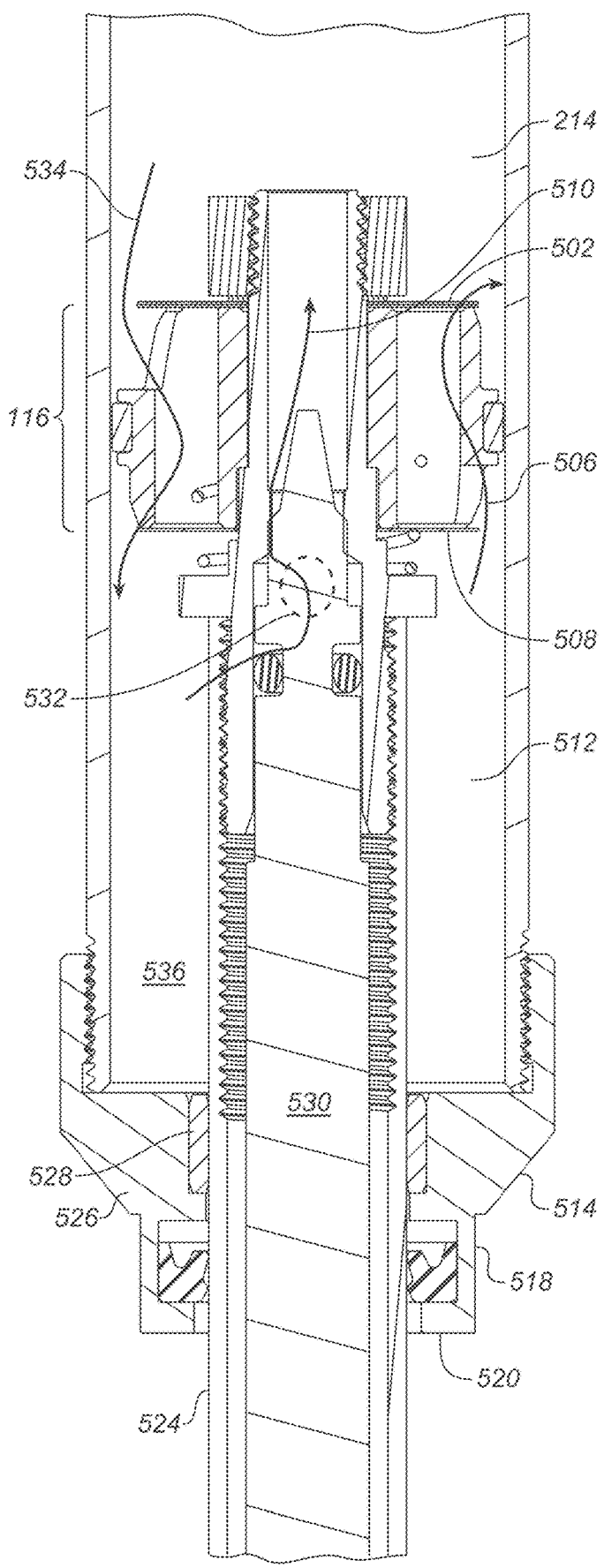
FIG. 5 depicts an enlarged cross-sectional view of a portion of the rod of FIG. 1A, in accordance with an embodiment.

FIG. 5 is an enlarged cross-sectional view of a portion of the rod 106, and more particularly the main piston 116 and the seal head 526 shown in FIG. 1A, in accordance with an embodiment. Embodiments of the present technology provide a system for reducing friction between the shaft 524 and a sealing head 526 as the shaft 524 of the rod 106 moves into the fluid filled chamber 114 during compression and rebound. According to embodiments, the monotube damper 100 shown in FIG. 1A is placed within a fork leg of a fork. A portion of the rod 106 is located within an oil bath within the fork leg (fork leg not shown).

FIG. 5 shows the main piston 116, the shaft 524 and the needle 530 of the rod 106, a U-Cup 514 that includes: the seal head 526 (that functions to keep the fluid within the fluid filled chamber 114 from exiting the fluid filled chamber 114); a lip 518; and a seal 520. A bushing 528 is shown disposed between the shaft 524 of the rod 106 and the seal head 526 and functions at least to guide the shaft 524 into the fluid filled chamber 114. The main piston 116 is shown positioned between a first side 214 of the compression piston 112 and the chamber 536. The needle 530 is shown to include a hole 532 through which the oil 216 (see FIG. 2) may flow along pathway 510 from the chamber 536 to the first side 214 of the compression piston 112. The main piston 116 is shown to include a check valve 508 (also called the "mid-valve") and rebound shims 502 through which fluid flows along pathway 506.

With reference now to FIGS. 1A, 2 and 5 and according to an embodiment, the following fluid flow and fluid recirculation, from the oil bath, through the main piston 116 and compression piston 112, out of the wall of the air chamber 232 and back to the oil bath, is described in conjunction with the functioning of embodiments of novel components described herein.

As the fork leg, including the monotube damper 100, vibrates and shakes during a vehicle's operation, the oil 216 in the oil bath moves around and ultimately temporarily adheres to the shaft 524 of the rod 106. In response to an event causing compression of the shock absorber, the shaft 524 of the rod 106 moves into a portion 512 of the fluid filled chamber 114. The oil 216 on the shaft 524 also moves into the fluid filled chamber 114. In response to an event causing a rebound of the shock absorber, the shaft 524 of the rod 106 moves out of the fluid filled chamber 114, and the oil 216 that was temporarily adhering to the shaft 524 is scraped off and remains within the portion 512 of the fluid filled chamber 114. As the main piston 116 moves downward and in a direction away from the knob 108, a first portion of the oil within the portion 512 of the fluid filled chamber 114 moves through the hole 532 within the needle 530 and along the pathway 510 into the first side 214 of the compression piston 112. Another portion of the oil 216 within the fluid filled chamber 114 moves along pathway 506, pushes open the rebound shims 502 and moves through the resulting gap 504 into the first side 214 of the compression piston 112. Thus, a portion of the oil 216 that was in the oil bath is now inside of the fluid filled chamber 114.

As the shock absorber continues to compress and rebound, more oil transfers over into the fluid filled chamber 114. The fluid filled chamber 114 then starts to become overfilled with the oil 216. Depending on the amount of overfilling having occurred in the fluid filled chamber 114, the vehicle may hit a bump that causes the shock absorber to compress to the extent that the IFP 110 moves upwards along the shaft 212 such that it becomes positioned within the recess 234. Since the IFP 110 has an outside seal 302 and an inside seal 304, the IFP 110 moves into the recess 234 enough that it loses its seal between the shaft 212 and the inner surface of the wall of the air chamber 232. A gap between the shaft 212 and the IFP 110 is created such that the oil 216 then moves out of the fluid filled chamber 114 and through the passageway 210 along the leak path 208. The oil 216 then leaks back along the exterior of the fluid filled chamber 114 and falls once again into the oil bath.

Thus, the combination of the compression and rebound movements of the monotube damper 100, along with the novel design of the seal head 526 within a U-Cup 514 as well as the novel leak path 208 that includes the recess 234 etched into the shaft 212 and the passageway 210 enables an oil to be recirculated throughout the shock absorber. Such a recirculation system eliminates the friction occurring in conventional systems that function to keep two oils within a shock absorber separated.

While the foregoing is directed to embodiments of the present invention, other and further embodiments of the invention may be implemented without departing from the scope of the invention, and the scope thereof is determined by the claims that follow.

What we claim is:

1. A shock absorber, said shock absorber comprising:
    a fluid filled chamber;
    a main piston slidably disposed within said fluid filled chamber;
    a rod coupled to said main piston;
    a compression damper disposed within said fluid filled chamber, said compression damper comprising:
        a compression piston;
        a fluid filled chamber;
        an air chamber;
        an internal floating piston; and
        a single adjustable fluid circuit configured for controlling a damping rate associated with multiple compression speeds of said shock absorber, wherein said single adjustable fluid circuit comprises:
            a fluid passageway through said compression piston; and
            a positionally adjustable floating shim stack positioned at one end of said fluid passageway, said positionally adjustable floating shim stack configured for selectively blocking a flow of fluid through said fluid passageway; and
    a leak path configured for, upon compression, enabling oil to leak from said fluid filled chamber of said compression damper to a position exterior to said fluid filled chamber, wherein said leak path is part of a recirculation system of said shock absorber, said leak path wherein said leak path further comprises:
        a recess in a shaft of said compression damper, wherein during said compression an independent floating piston is pushed upwards along said shaft by said flow of said oil until reaching said recess, at which point said oil leaks through a gap between a surface of said recess and said independent floating piston, wherein said recess comprises:
            a curvature at one side configured for guiding said oil toward a wall of an air chamber of said compression damper; and
            a passageway in said wall of said air chamber through which said oil flows.

2. The shock absorber of claim 1, wherein said multiple compression speeds comprise:
    a lockout speed.

3. The shock absorber of claim 1, wherein said positionally adjustable floating shim stack comprises:
    a top surface;
    a bottom surface;
    a first end that remains unclamped to any other component of said compression damper during a compression of said shock absorber and, upon a position adjustment of said first end such that a first component of said compression damper provides a first pre-load against said top surface at said first end, moves a distance into said fluid passageway; and
    a second end that flexes upwards when said flow of fluid through said fluid passageway pushes up against said bottom surface and overcomes a predetermined stiffness of said positionally adjustable floating shim stack.

4. The shock absorber of claim 3, wherein said position adjustment is accomplished via a manual rotation of an adjustment knob coupled with said positionally adjustable floating shim stack.

5. The shock absorber of claim 3, wherein said first component comprises:
    a pre-load hat.

6. The shock absorber of claim 5, further comprising:
a second component providing a second pre-load against said top surface at said second end during an upward flexing of said second end.

7. The shock absorber of claim 6, wherein said second component comprises:
a wave spring.

8. The shock absorber of claim 6, wherein said first component comprises:
said pre-load hat, wherein a first portion of said pre-load hat presses against said positionally adjustable floating shim stack, and a second portion of said pre-load hat presses against said second component, thereby supporting said second pre-load being applied against said top surface at said second end of said positionally adjustable floating shim stack during an upward flexing of said second end.

9. The shock absorber of claim 1, wherein said positionally adjustable floating shim stack comprises:
a first position corresponding to a compression adjustment wherein said positionally adjustable floating shim stack lies flat across said opening to said fluid passageway.

10. The shock absorber of claim 9, wherein said positionally adjustable floating shim stack comprises:
a second position corresponding to a compression speed greater than a minimum compression adjustment speed, wherein said second position comprises:
a concave shape.

\* \* \* \* \*